US006766113B1

(12) United States Patent
Al-Salameh et al.

(10) Patent No.: US 6,766,113 B1
(45) Date of Patent: Jul. 20, 2004

(54) CONTROL CHANNEL PROCESSOR AND SWITCHING MECHANISM

(75) Inventors: Daniel Y. Al-Salameh, Marlboro, NJ (US); Mario F. Alvarez, Beachwood, NJ (US); David S. Levy, Freehold, NJ (US); Jithamithra Sarathy, Eatontown, NJ (US); Anastasios Tzathas, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 459 days.

(21) Appl. No.: 09/596,378

(22) Filed: Jun. 16, 2000

(51) Int. Cl.[7] .................... H04B 10/08; H04B 10/20; H04J 14/00; H04J 3/04; G02F 1/00
(52) U.S. Cl. .................... 398/30; 398/3; 398/19; 398/31; 398/33; 398/45; 398/59; 370/221; 370/222; 370/535
(58) Field of Search ............... 398/3–5, 6, 19, 398/30, 31, 33, 45, 51, 59, 67; 370/221, 222, 223, 535

(56) References Cited

U.S. PATENT DOCUMENTS 5,406,401 A * 4/1995 Kremer .................... 359/110
5,986,783 A * 11/1999 Sharma et al. ............ 359/119

* cited by examiner

Primary Examiner—M. R. Sedighian

(57) ABSTRACT

A facility is provided to allow a supervisory message to quickly propagate through a transmission network without delay. Specifically, a supervisory message is quickly routed from one node to a next node by (a) splitting the control channel signal carrying the supervisory message at a receiving node, (b) sending one of the split control channel signals to an output via switchable apparatus for immediate transmission the next node and (c) sending the other split signal to a controller for analysis. If the controller invokes a predetermined procedure as a result of the content of the message, e.g., invokes protection switching, then the controller forms a supervisory message identifying the invoked procedure, operates the switchable apparatus so that the message identifying the invoked procedure may be routed to the output in place of the split channel signal message.

14 Claims, 2 Drawing Sheets

200-i

CONTROL CHANNEL PROCESSOR AND SWITCHING MECHANISM

TECHNICAL FIELD

The invention relates to optical communications networks, and more particularly relates to a protection ring architecture for such networks.

BACKGROUND OF THE INVENTION

Optical transmission systems and, especially systems using Dense Wavelength Division Multiplexing (DWDM), are desirable since they provide extremely wide bandwidths for communications channels. Each communications channel in a DWDM transmission system carries a plurality of, for example, 16, 40 even 80, optical channels (wavelengths) on a single optical fiber and single optical repeater. However, there is a trade off between providing wider bandwidth communications channels, with their corresponding lower cost of transport, and their vulnerability to a large-scale disruption of communications services due to a transmission medium failure. Therefore, it is important that an optical transmission system, for example, those employing DWDM, have the capability to recover quickly from a transmission medium failure because of the impact that such a failure has on communications services.

When a node detects a transmission failure, i.e., a loss of signal (LOS), it enters a series of restoration logic steps to determine if it ought to invoke protection switching procedures, e.g., so called 1+1 or 0×1 protection switching, to quickly recover from the failure. If not, then the node sends a message identifying the failure in a control (supervisory) channel to a next node. The next node similarly determines if it ought to invoke protection switching to deal with the failure. If not, then that node sends the message identifying the failure in the control channel to a next node, an so on. When a node receiving the failure message determines that it ought to invoke protection switching and does so, it then notifies the other nodes via the control channel that such protection switching has been invoked.

It can be appreciated that the above procedure is time consuming, and is especially so for those transmission systems that have to invoke protection switching as quickly as possible to meet customer expectations relating to system "down time".

SUMMARY OF THE INVENTION

We have recognized that the best way in which to route a supervisory message from one node to a next node of a transmission system is to split the control channel signal carrying the supervisory message, send one of the split control channel signals to an output via switchable apparatus for immediate transmission to the next node and send the other split control channel signal to a controller for analysis. If the controller, responsive to the supervisory message, invokes a predetermined procedure, e.g., protection switching, it then forms a supervisory message identifying the invoked procedure, operates the switchable apparatus to route the latter message to the output in place of the split control channel signal message.

These and other aspects of the invention will be appreciated from the following detailed description, accompanying drawings and ensuing claims.

DETAILED DESCRIPTION

The claimed invention will be discussed in the context of an optical transmission system having a ring architecture. It is understood of course that that should not be construed as a limitation, since the art will appreciate from the following discussion that the claimed invention may be practiced in other than ring architectures.

Figure 1:
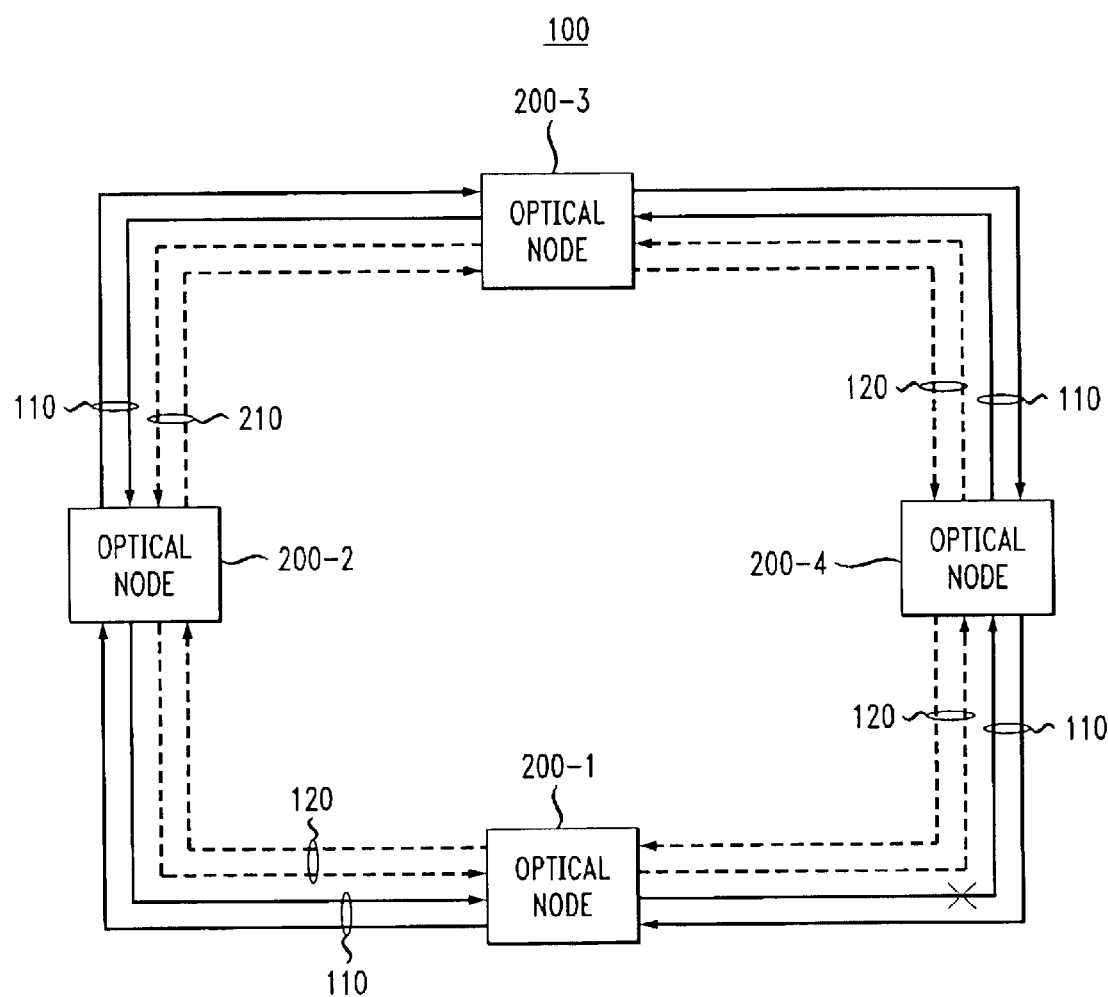
FIG. 1 is broad block diagram of a optical ring transmission system in which the principles of the invention may be practiced.

With that in mind, a bi-directional optical transmission system 100 shown in simplified form in FIG. 1 comprises a plurality of optical nodes connected in a ring configuration. For the sake of simplicity and clarity only four of the optical nodes, 200-1 through 200-4, are shown, in which each of the nodes incorporates an embodiment of the invention. Optical nodes 200-1 through 200-4 are interconnected in a ring configuration by optical transmission media 110 which transports, e.g., active (primary) service transmission capacity. Nodes 200-1 thorough 200-4 are also interconnected in a ring configuration by optical transmission media 120 which transports, e.g., standby (protection) transmission capacity. The latter capacity may be used to transport what we call pre-emptory (secondary) service traffic, which a node sheds in favor of the active traffic when a transmission failure occurs. In an illustrative embodiment of the invention, optical transmission medium 110 and 120 are formed from optical fibers, and each may be comprised of a single optical fiber or two optical fibers. To say it another way, optical transmission system 100 could be either a two optical fiber system or a four optical fiber system, in which each of the fibers includes one-half of the service bandwidth and one-half of the protection bandwidth. In an alternative embodiment of the invention, one of the two optical fibers can carry active service transmission capacity and the other one of the two fibers can carry protection transmission capacity. In a four optical fiber system, separate optical fibers are used to transport active service transmission capacity in both directions of transmission and separate optical fibers are used to transport standby protection transmission capacity in both direction of transmission. Optical transmission system 100 may transport 8, 16, 32, 40, 80, etc. communications channels, i.e., wavelengths. Note that, in addition to the communications channels, an extra telemetry control (supervisory or control) channel may be used as a maintenance channel in the two optical fiber arrangement or the four optical fiber arrangement. Thus, in an eight channel system, nine channels are transported, in a sixteen channel system, 17 channels are transported, and so on. The maintenance channel is used, among other things, to transport protection switching information for configuring nodes 200-1 through 200-4 in system 100 when a transmission failure occurs and is detected by a node.

Assume that a transmission failure occurs in the path between nodes 200-1 and 200-4 as represented by the "X" in path 110. The transmission failure may be manifested by one of a number of different failures, including, for example, (a) a decrease in the power level of the signal below a predetermined threshold; (b) the error rate of the received signal exceeds a predetermined error rate; or (c) the signal-to-noise ratio for the received signal falls below a predetermined signal-to-noise ratio. When a node detects one of these failures, it then declares a loss of signal (LOS) and determines if it ought to invoke protection switching to recover from the failure. If not, then, as mentioned above, it sends a message identifying the failure to a next node. For example, if node 200-4 detects a loss of signal for the inbound path 110 from node 200-1, then node 200-4 enters the aforementioned logic steps to determine if it ought to invoke protection switching, and sends a supervisory message upstream in the control channel to node 200-3 if it concludes otherwise. Node 200-3 upon receipt of the control channel message immediately outputs the message to the next node, e.g., node 200-2, and in parallel therewith, determines if it ought invoke protection switching to deal with the loss of signal. Thus, in accord with an aspect of the invention, the supervisory message is not delayed at a node until a determination is made by the node, but is immediately outputted to a next node in parallel with making such a determination.

Figure 2:
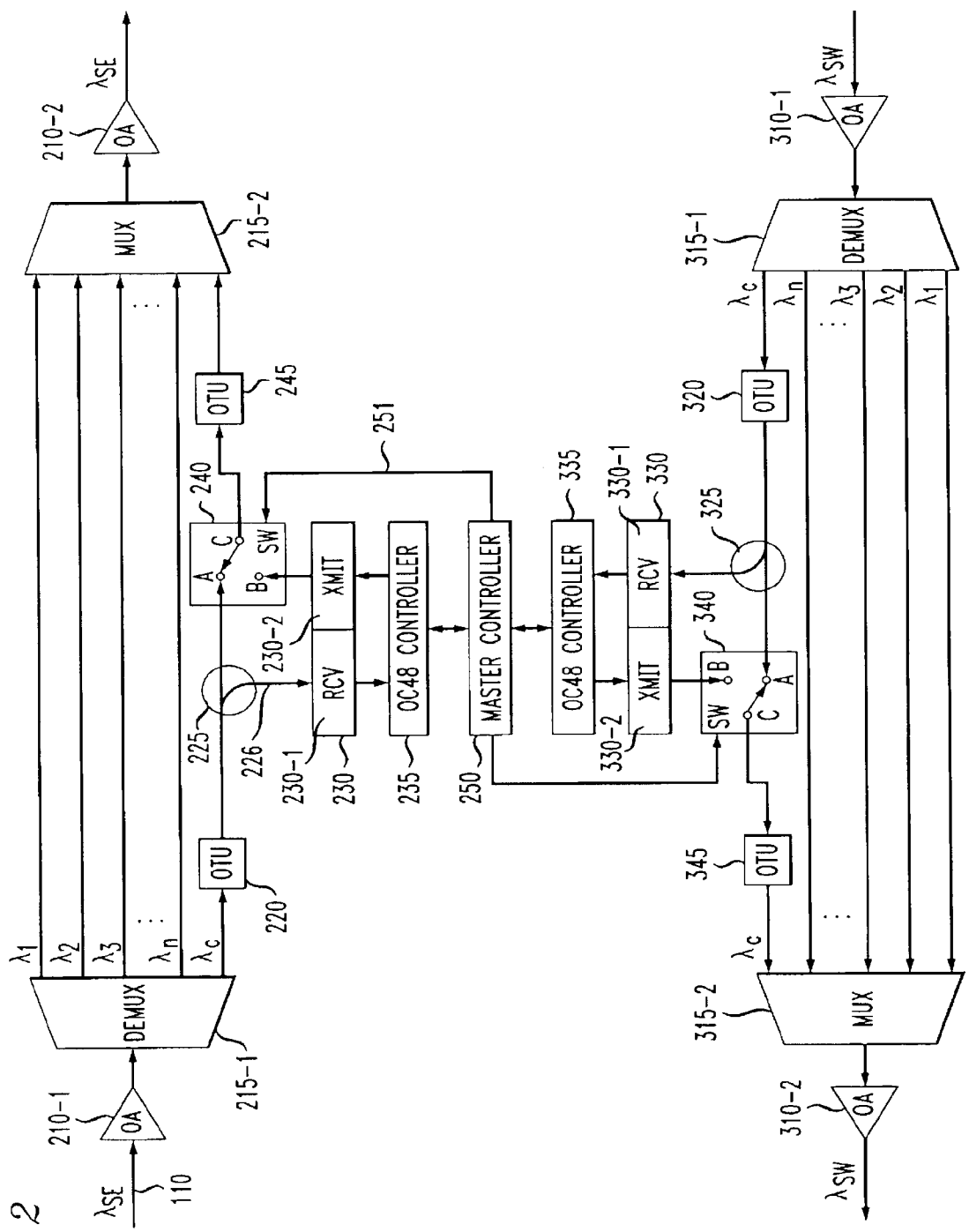
FIG. 2 is a broad block diagram of an optical node of FIG. 1.

A broad block diagram of an optical node 200-i arranged in accordance with the principles of the invention is shown in FIG. 2. A discussion of optical node 200-i equally pertains to the other nodes shown in FIG. 1. Moreover, a discussion of the way in which the control channel, $\lambda_c$, carried in the easterly bound service signal, $\lambda_{SE}$, arriving at optical amplifier 210-1 is processed equally pertains to the way in which the control channel, $\lambda_c$, carried in the westerly bound service signal, $\lambda_{SW}$, arriving at optical amplifier 310-1 is processed. Further, such processing includes similar equipment associated with a common master controller 250. Optical node 200-i includes in the easterly direction, inter alia, optical amplifier 210-1 that amplifies an inbound optical signal, $\lambda_{SE}$, received via service path 110. The amplified signal, in turn, is demultiplexed at demultiplexer 215-1 into a plurality of component signals (also referred to herein as "channels") $\lambda_1$, through $\lambda_n$. Information carried by individual ones of the channels is processed at node 200-i and routed to respective customers as represented by the dashed lines for signals $\lambda_1$ and $\lambda_3$. The demultiplexed signals also include the control channel $\lambda_c$. In an illustrative embodiment of the invention, the control channel is processed at a particular wavelength, e.g., 1310 nanometers, but is transmitted at another particular wavelength, e.g., a wavelength in the 1550 nanometer range. This is done to take advantage of so-called off-the-shelf, short-reach optical equipment, which generally operates in the 1310 nanometer range. It is understood of course that this should not be taken as a limitation since short-reach optical equipment that would operate in 1550 nanometer range could be readily designed to eliminate the need to convert an incoming channel, e.g., the control channel, from the 1550 nanometer range to 1310 nanometers to process the contents of the channel.

The demultiplexed control channel is supplied to Optical Translation Unit (OTU) 220, which, in a conventional manner, amplifies and then converts (translates) the control channel from a signal in the 1550 nm range to a signal in the 1310 nm range. The converted 1310 nm optical signal is supplied to a conventional optical splitter 225, which supplies a portion of the converted signal to the "A" terminal of switch (SW) 240 and a portion to receiver 230-1 of transceiver 230. (Note that switch 240 is a fast optical switch, for example, a Mach Zender optical switch, but is represented in the FIG. as a conventional electrical switch for the sake of simplicity and clarity.) In a default mode, terminals A and C of switch 240 are connected to one another to supply the converted signal to OTU 245, which amplifies and converts (translates) 1310 nm wavelength signal back to a signal having a wavelength in the 1550 nm range. The latter optical signal is then supplied to multiplexer 215-2, which multiplexes the control channel signal with the service signals/channels $\lambda_1$ through $\lambda_n$ to a multiplexed output. The outputted multiplexed signals are then amplified by conventional optical amplifier 210-2 and forwarded to the next node, without delay, all in accordance with an aspect of the invention.

Receiver 230-1, on the other hand, converts, in a conventional manner, the optical signal/channel that it receives via splitter 225 into an electrical digital signal, and supplies the latter signal to OC48 controller 235. Controller 235 demultiplexes the OC48 signal to recover the supervisory message carried by the OC48 signal, and supplies the recovered message to master controller 250. Master controller 250 then analyzes the message to determine what action it needs to take if any. If master controller 250 concludes that it does not need to take any action, then it disregards the message. If the message happens to pertain to a loss of signal, and master controller determines that it ought to invoke protection switching, then master controller 250 causes the service traffic to be switched to the protection channels of transmission path 120 to recover from the loss of signal. In addition, master controller 250 forms a supervisory message indicating that such protection switching has been invoked at node 200-i, and supplies the message to OC48 controller 235. In addition, master controller 250 send a control signal via lead 251 to controllably (switchably) operate switch 240, causing terminal C to switch to terminal B. Controller 235 maps the message into a message having an OC48 signal format and outputs the message to optical signal transmitter 230-2. Transmitter 230-2 converts the digital signal that it receives from controller 235 into its optical equivalent having a wavelength of 1310 nm and supplies the converted optical signal to terminal B of switch 240. When so operated, switch 240 routes the signal from terminal B to the input of OTU 245, which, in a conventional manner, converts the wavelength of the optical signal from 1310 nm to an optical signal in the 1550 nm range. The supervisory message originated by master controller 250 is then multiplexed to the output of MUX 215-2 and transported to the next node via OA 215-2, all in accordance with the principles of the invention.

In the westerly direction, optical node 200-i similarly includes, inter alia, optical amplifiers 310-1 and 310-2, demultiplexer 315-1, multiplexer 315-2, splitter 325, transceiver 330, OC48 controller 335, optical switch 340, OTUs 320 and 345 as well as commoner master controller 250. As mentioned above, the foregoing discussion equally pertains to such equipment and to the service signal, $\lambda_{SW}$, traveling in the westerly direction It will thus be appreciated that, although the invention illustrated herein is described in the context of a specific illustrative embodiment, those skilled in the art will be able to devise numerous alternative arrangements which, although, not explicitly shown or described herein, nevertheless, embody the principles of the invention and are within its spirit and scope.

We claim:

1. A transmission system comprising a plurality of nodes interconnected to one another by transmission media, each of said nodes comprising;

a receiver to receive a signal formed from a plurality of channel signals, a demultiplexer for separating the received signal into individual ones of the channel signals including a control channel signal containing a supervisory message, a splitter to split the control channel signal into first and second control channel signals, a controllable switch to switchably route the first control channel signal substantially immediately upon obtaining it from said splitter to an output for transmission to a next node, and a controller, responsive to the presence of the second control channel signal and responsive to the content of the supervisory message, invokes a predetermined procedure, generates a supervisory message identifying the invoked procedure, and causes the controllable switch to switchably route the generated supervisory message to said output.

2. The system of claim 1 wherein the controllable switch is an optical switch.

3. The transmission system of claim 1 wherein a node further comprises, a first optical translator to convert a wavelength of the control channel signal to a first predetermined wavelength forming a converted signal, and a second optical translator to convert a wavelength of the converted signal to be supplied to the output to a second predetermined wavelength.

4. The system of claim 3 wherein said first predetermined wavelength is a 1310 nanometer wavelength, and said second predetermined wavelength is a 1550 nanometer wavelength.

5. The system of claim 4 wherein said output includes a multiplexer that multiplexes the converted signal, as well as service signals that are being supplied, to the output for transmission to a next one of the nodes.

6. The transmission system of claim 1 wherein the transmission system is an optical transmission system.

7. The transmission system of claim 1 wherein the invoked procedure is a protection switching function.

8. A transmission node comprising a receiver to receive a signal formed from a plurality of channel signals from a transmission path, a demultiplexer for separating the received signal into said channel signals including a control channel signal carrying a supervisory message, a separator to separate the control channel signal into first and second control channel signals, a controllable switch to switchably route the first control channel signal substantially immediately upon obtaining it from said separator to an output, and a controller to process the second control channel signal and to invoke a predetermined procedure responsive to the content of the supervisory message, to generate another supervisory message indicating that the predetermined procedure has been invoked, and to control said controllable switch to switchably route the generated supervisory message to the output.

9. The transmission node of claim 8 wherein the controllable switch is an optical switch.

10. The transmission node of claim 8 wherein a node further comprises, a first optical translator to convert a wavelength of the control channel signal to a first predetermined wavelength forming a converted signal, and a second optical translator to convert a wavelength of the converted signal to be supplied to the output to a second predetermined wavelength.

11. The transmission node of claim 10 wherein said first predetermined wavelength is a 1310 nanometer wavelength, and said second predetermined wavelength is a 1550 nanometer wavelength.

12. The transmission node of claim 11 wherein said output includes a multiplexer that multiplexes the converted signal, as well as service signals that are being supplied, to the output for transmission to a next node.

13. The transmission node of claim 8 wherein the transmission node is an optical transmission node disposed in an optical transmission system.

14. The transmission node of claim 8 wherein the predetermined procedure is one of a plurality of different protection switching functions.

* * * * *